United States Patent [19]

Kauffman et al.

[11] Patent Number: 5,260,778
[45] Date of Patent: Nov. 9, 1993

[54] APPARATUS FOR SELECTIVE DISTRIBUTION OF MESSAGES OVER A COMMUNICATIONS NETWORK

[75] Inventors: Marc Kauffman, Cheltenham, Pa.; Michael Miller, Riverton, N.J.

[73] Assignee: General Instrument Corporation, Hatboro, Pa.

[21] Appl. No.: 543,700

[22] Filed: Jun. 26, 1990

[51] Int. Cl.⁵ ............................................. H04H 1/02
[52] U.S. Cl. ...................................... 358/86; 455/6.2; 358/142; 358/183
[58] Field of Search ........................................ 455/2–6, 455/3.1, 4.1, 4.2, 6.2, 6.3, 132, 133, 137, 140, 141; 358/84, 86, 149, 260, 142, 147, 183; 380/10; 340/825.44

[56] References Cited

U.S. PATENT DOCUMENTS

| | | | |
|---|---|---|---|
| 4,218,698 | 8/1980 | Bart et al. | 358/183 |
| 4,388,645 | 6/1983 | Cox et al. | 358/86 |
| 4,531,020 | 7/1985 | Wechselberger et al. | 358/122 |
| 4,536,791 | 8/1985 | Campbell et al. | 358/122 |
| 4,546,382 | 10/1985 | McKenna et al. | 358/84 |
| 4,600,921 | 7/1986 | Thomas | 358/86 |
| 4,700,386 | 10/1987 | Kohn | 380/10 |
| 4,712,239 | 12/1987 | Freeza et al. | 358/86 |
| 4,829,569 | 5/1989 | Seth-Smith et al. | 358/149 |
| 4,885,775 | 12/1989 | Lucas | 455/6 |
| 4,890,321 | 12/1989 | Seth-Smith et al. | 455/6 |
| 4,894,789 | 1/1990 | Yee | 358/86 |
| 4,977,455 | 12/1990 | Young | 358/86 |
| 4,991,011 | 2/1991 | Johnson et al. | 358/86 |
| 5,003,591 | 3/1991 | Kauffman et al. | 358/86 |
| 5,016,273 | 5/1991 | Hoff | 340/825.44 |
| 5,155,591 | 10/1992 | Wachob | 358/86 |

OTHER PUBLICATIONS

"British Broadcasting Corporation Specification" pp. 6 and 8, Sep. 1976.

Primary Examiner—Reinhard J. Eisenzopf
Assistant Examiner—Andrew Faile
Attorney, Agent, or Firm—Barry R. Lipsitz

[57] ABSTRACT

Specific text and/or graphic messages for individual subscribers or groups of subscribers are distributed on a communications network such as a cable television system. An addressable controller communicates with a plurality of subscriber terminals served by the network. Each subscriber terminal is assigned to a primary message group and may be assigned to one or more message subgroups. Messages are input to the addressable controller for subsequent transmission to a subscriber terminal for display. The messages are tagged with distribution data defining at least one primary message group or message subgroup to receive the message. The tagged text messages are transmitted over the network together with signals from network service providers. Global messages can be sent by leaving the distribution data field blank, or filling it with a special code such as a string of zeros. Wild card tags are also permitted. A subscriber terminal for receiving the messages has a first path for processing a service signal received from the network and a second path for processing a message signal received from the network. The distribution data is retrieved from a received message and used to determine if the message is targeted to the subscriber terminal. If so, the message is processed for display. The message can be displayed alone or overlaid on a video program signal being viewed.

21 Claims, 3 Drawing Sheets

APPARATUS FOR SELECTIVE DISTRIBUTION OF MESSAGES OVER A COMMUNICATIONS NETWORK

BACKGROUND OF THE INVENTION

The present invention relates generally to communications networks, and more particularly to the selective distribution of messages to subscribers on a cable television network or the like.

Various communications networks, including cable television (CATV), subscription television (STV) and direct broadcast satellite (DBS) systems are available for distributing television programming for entertainment, weather, news and advertising. Operators of such systems typically communicate with their subscribers through the postal system. Invoices, advertisements, program guides, and other letters or cards may be sent to all subscribers, groups of subscribers, or individual subscribers depending on the particular communication. Reliance on printed materials sent through the mail is expensive and wasteful of resources, particularly where a communications network is already in place linking the system operator with individual subscribers. In the past, however, use of the communications network for transmitting messages to subscribers has been limited, and any such communications attempted have been on a global basis to all subscribers at the same time. Examples include the transmission of specially produced programming from an operator to subscribers over the communications network, and the use of an alphanumeric character generator to display text messages on a video channel. In the latter case, the alphanumeric characters are combined with a video program signal at the headend to produce a composite channel signal for distribution over the network like any other television channel signal. Distribution of text and graphics messages to individual subscribers or groups of subscribers has not been possible over existing CATV, STV, or DBS systems.

It would be advantageous to provide for the distribution of specific messages to individual subscribers or special groups of subscribers via a CATV communications network or the like. Uses of such a system would include the dissemination of subscriber invoices, paging messages, emergency alert information, group specific or targeted advertising, reminder messages, event scheduling messages, program guides, general interest information, and other types of text and/or graphics messages. The present invention provides such a system.

SUMMARY OF THE INVENTION

In accordance with the present invention, a subscriber terminal ("converter") is provided for processing signals received from a communications network. A first path in the converter processes a received video signal. A second path processes a received message signal. An adder combines a video signal from the first path and a message signal from the second path in the converter. Switch means responsive to a control signal are provided for selectively outputting to a display the first path video signal, the second path message signal, or the combined signals from the adder.

The converter can further comprise means for retrieving tag data appended to each message signal, and means responsive to the tag data for generating control signals to actuate the switch means. Tag data can also be used to force the display of an emergency message by energizing a converter that has been turned off.

Means can also be provided for determining if a video signal is present in the first path, and for actuating the switch means to output only the second path message signal when there is no video signal present in the first path. The means for determining whether a video signal is present can comprise a video sync detector.

Video display generator means are provided in the second path of the converter for converting received message data to a video message signal for input to the adder and switch means. A video sync signal detected in the first path is input to the video display generator for use in synchronizing the video message signal to a video signal carried on the first path.

In another embodiment, a converter for processing signals received from a communications network includes a first data path for processing a received video signal, a second data path for processing a received message signal, and memory means coupled to the second path for storing message data. Means are also provided for retrieving control data appended to the received message signal. Means responsive to the retrieved control data outputs the second path message signal combined with the first path video signal, outputs the second path message signal alone, or stores the second path message signal in the memory means for later retrieval and display. A message waiting indicia is generated for use when message data is stored in the memory means. Means can further be provided to determine if a video signal is present in the first path, and for inhibiting the output of a combined signal from the first and second paths unless a video signal is present.

In addition to the converter, apparatus is provided for selectively distributing messages over a communications network. An addressable controller communicates with a plurality of subscriber terminals. Each of the subscriber terminals is assigned to a primary message group. Selected ones of the subscriber terminals are assigned to one or more message subgroups. Text messages are input to the addressable controller for subsequent transmission to a subscriber terminal or group of terminals for display. The messages are tagged with distribution data defining at least one primary message group or message subgroup to receive the message. The tagged text messages are transmitted over the network together with signals from network service providers.

In a preferred embodiment, means are provided for generating a wild card tag for a message. A wild card tag can be used, for example, to disseminate a message to subscribers assigned to the same message subgroup regardless of their primary message group. Alternately, the distribution data field can be left blank (or filled with a special code such as a string of zeros) to transmit a message globally.

The messages can be transmitted together with control data in an addressable data stream carried on the network. Bandwidth allocation means, operatively associated with the addressable controller, allocates bandwidth within the data stream among the messages. The bandwidth allocation means can allocate more bandwidth to messages having a high priority than to messages having a lower priority.

The transmission of a message over the network can be periodically repeated for a predetermined time period. This will increase the likelihood that every subscriber intended to receive the message will actually receive it. For example, if a subscriber receives messages through a converter that is powered by a switched outlet, a message may not be received the first time it is transmitted. However, at some point the converter will be powered up, and the message will be captured during a repeat transmission.

DETAILED DESCRIPTION OF THE INVENTION

Figure 1:
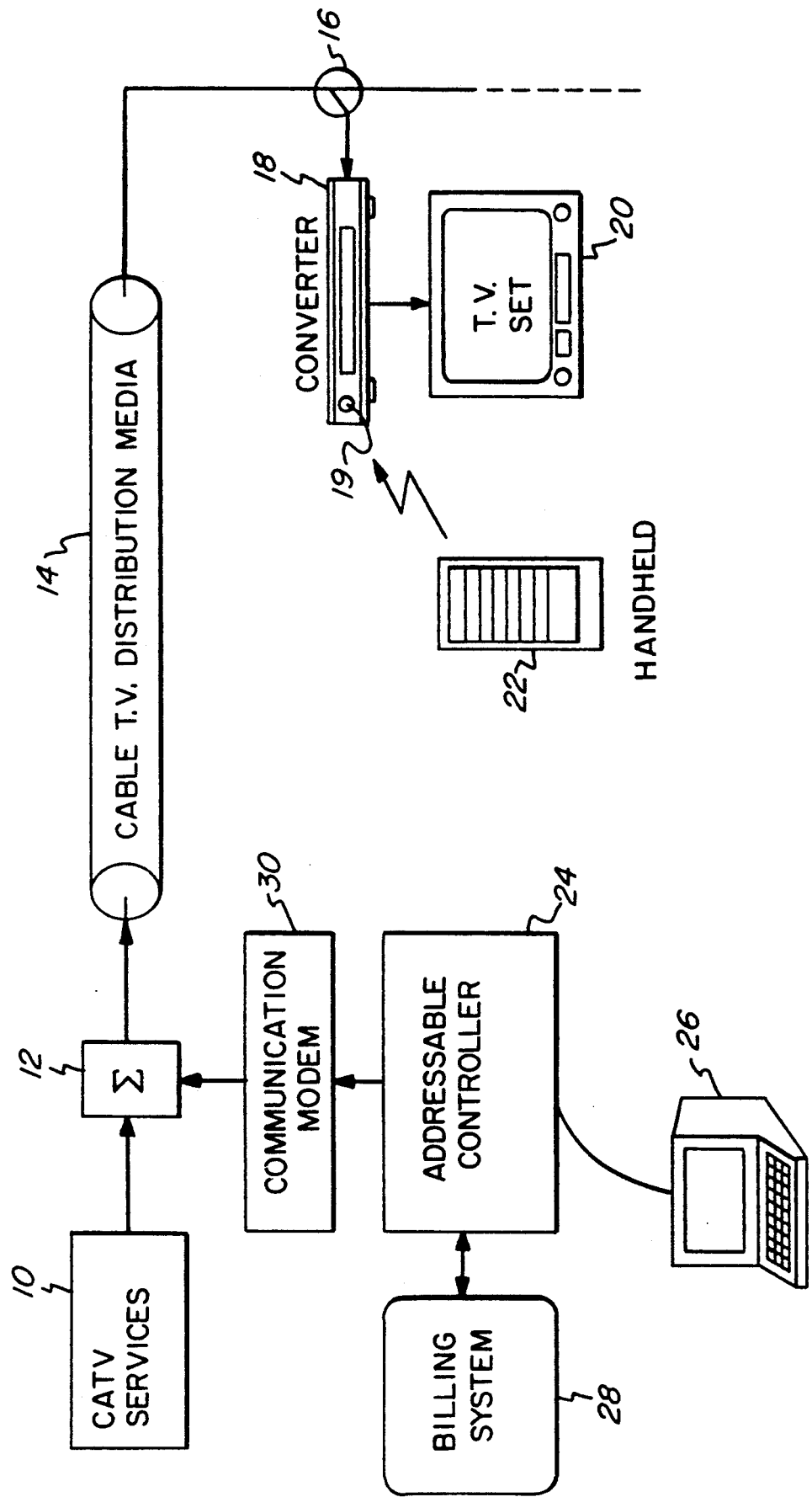
FIG. 1 is a block diagram of a cable television network embodying the present invention.

FIG. 1 illustrates a cable television system embodying the present invention. It should be appreciated that the invention may be used in various types of communication networks, including STV and DBS systems, and is not limited to the CATV embodiment illustrated.

A cable television network distributes services provided by various programmers such as Home Box Office (HBO) and other premium programming providers, pay-per-view events, and off-the-air television programming. Such services, generally designated by box 10 in FIG. 1, are transmitted using well known components over the CATV distribution media 14 for distribution to subscribers. Distribution media 14 can comprise coaxial cable, fiber optic cable, or other transmission medium. At a remote location, the CATV service signals are input via a signal splitter 16 to a subscriber terminal ("converter") 18, which enables a subscriber to tune to a particular channel to receive a desired service for display on television set 20. Converter 18 also provides other functions, such as an interface with a handheld remote control 22, descrambling of scrambled premium signals, and additional functions well known in the art. In accordance with the present invention, a message indicia light 19 is provided on the converter to advise a subscriber that a message has been stored in the converter for retrieval. In an alternate embodiment, a message queue screen can be provided on the subscriber's television to advise of any messages waiting to be retrieved.

At the cable system headend, an addressable controller 24 enables the system operator to communicate with individual subscriber converters. In the past, addressable controllers have been used at the headend primarily to authorize or deauthorize individual converters to receive premium signals. The addressable controller maintains a database of all subscribers in the system. The database contains information including service authorizations and converter address data for each subscriber.

In accordance with the present invention, addressable controller 24 additionally contains grouping information relating subscribers to specific messaging groups. Each subscriber terminal in the system is assigned to a primary message group and may be additionally assigned to one or more message subgroups. The terminal is also identified by a unique address. In this manner, addressable controller 24 allows messages to be selectively disseminated to individual subscribers, to specific groups of subscribers, or to all subscribers. The addressable controller also provides means to compose, modify and store messages for distribution. At the headend, such messages are input to the addressable controller via a user terminal 26.

Addressable controller 24 is also coupled to the headend billing system 28. The billing system maintains records of services delivered to each subscriber, and creates invoices to be sent to subscribers for billing purposes. The billing system also maintains a record of subscriber payments. In accordance with the present invention, billing system 28 additionally creates and transfers messages to addressable controller 24 for dissemination to subscribers. Such messages may contain invoice and/or delinquency notices, as well as other account information.

In past systems, addressable controller 24 transmitted address and control data to subscriber converters via a separate FM data path carried on the network. In accordance with the present invention, the same data path may be used for communication of text and graphics messages. The data is coupled to the CATV network via a communication modem 30. An adder 12 is provided for transmitting the text/graphics messages and control data from addressable controller 24 over the network together with the CATV service signals. In a preferred embodiment, the message information is interleaved in time with other control information from the addressable controller, in accordance with well known multiplexing techniques. In an alternate embodiment, the message information is transmitted on a frequency separate from the addressable control information. Additional embodiments are possible wherein message information is transmitted on separate data carriers, or as data embedded in the video or audio signal of television signals carried on the cable distribution system.

In order to provide group dissemination of messages, the converter population of the system is broken down into a multilevel grouping structure. For example, in a two-level grouping structure each converter is assigned as a member of a primary group and may also be assigned to one or more subgroups. Various primary groups are used to segregate converters based on geographical area, distribution hub, or any other parameter. Subgroups can be used to segregate subscribers into groups of particular interest, such as volunteer firemen, civil defense workers, cable television company employees, and the like. Subgroups can also be defined for different socioeconomic groups, subscribers having special interests, targeted age groups, or any other parameter of interest.

By assigning group and subgroup identifiers to individual subscriber converters, specific messages can be directed to members of particular groups and subgroups. Addressable controller 24 directs messages to specific groups of subscribers using primary group and subgroup identifiers. The addressable controller can also replace specific identifiers with "wild card" identifiers in a primary or subgroup message specification. As an example, a particular system may assign primary group identifiers to each different geographic hub in the system. A subgroup identifier may define civil defense workers. In an emergency, addressable controller 24 can distribute a message to the civil defense workers in all hubs by using a wild card identifier for the primary group and the civil defense identifier for the subgroup.

Figure 2:
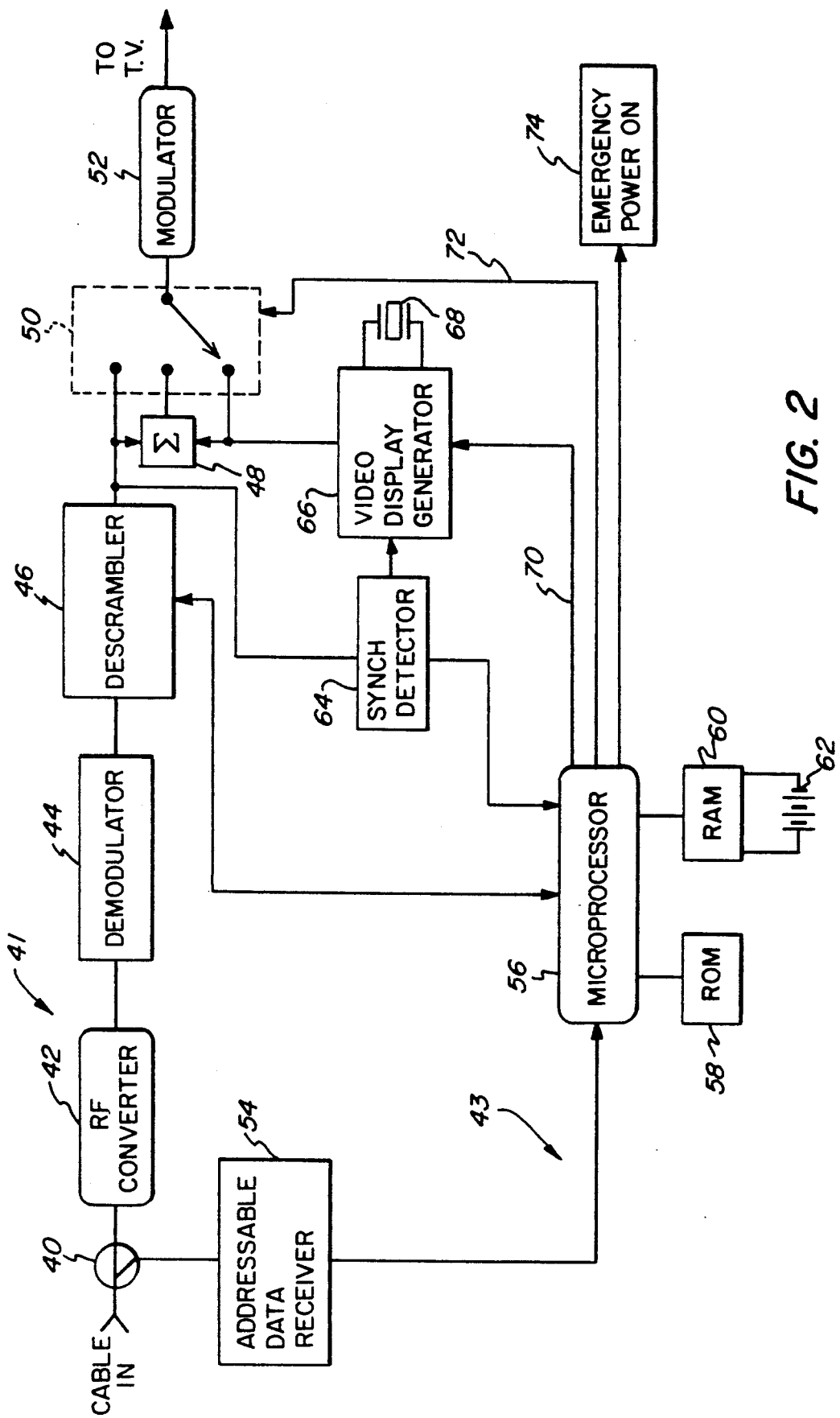
FIG. 2 is a block diagram of an addressable converter for use in receiving cable television services and messages in accordance with the present invention.

FIG. 2 illustrates a CATV converter for use in connection with the present invention. The signals input from a cable system are split at a splitter 40 into a first path generally designated 41 and a second path generally designated 43. In the first path, a conventional RF converter 42 tunes to a desired cable channel, and the selected signal is demodulated in a conventional demodulator 44. If the channel contains premium programming, and the subscriber is authorized to receive the particular premium service, a conventional descrambler 46 is enabled by a microprocessor 56 to descramble the signal for viewing by the subscriber. In any event, the first path video signal can be coupled through switch 50 to a modulator 52 for output to the subscriber's television set.

In the second path, control signals and message signals from addressable controller 24 are recovered by an addressable data receiver 54. Typically, receiver 54 is a conventional FM data receiver that retrieves the control and message data from an addressable data stream carried on the cable network. The retrieved data is input to microprocessor 56 for further processing as described below.

Microprocessor 56 is operated in accordance with operating software stored in ROM 58. A nonvolatile RAM 60 with backup battery power 62 is also provided for use with microprocessor 56. The processing of control data by microprocessor 56 is conventional. In accordance with the present invention, microprocessor 56 also processes message data.

The message data transmitted by addressable controller 24 and received by addressable data receiver 54 contains message information as well as tag data containing group and subgroup identifiers for the message (distribution data) and optional control data for use in actuating switch 50. Microprocessor 56 receives the message signals, performs a validity test on the data (e.g., a checksum computation or parity bit check) and interprets the distribution data to determine whether the message is intended to be processed by the subscriber terminal. If a message is not directed to the particular converter, it is ignored. All messages that are directed to the converter either specifically (e.g., via the converter's unique address), by group, or globally are stored in RAM 60 for subsequent retrieval and display. RAM 60 has sufficient capacity to store a plurality of messages for later recall and display by the subscriber. Alternately, messages directed to the converter and input to RAM 60 can be immediately output for display on the subscriber's television set.

The tag data for a message can contain control codes indicating whether the message should be stored for later recall by the subscriber, displayed immediately while blocking the selected video channel (i.e., override the current video program), or displayed immediately by overlaying alphanumeric characters and/or graphics on top of a video program being viewed at the subscriber premises. Tag data can also instruct the microprocessor to output a "power-on" signal to an emergency power-on circuit 74. This feature is used when an emergency message is transmitted (e.g., for civil defense or fireman dispatch purposes) and the subscriber converter is turned off. In conventional addressable converters, the addressable data receiver and microprocessor are always active when the unit is plugged in, allowing the provision of the emergency power-on feature. Upon receipt of a power-on signal, the converter and a television powered thereby will be energized for display of the emergency message.

When a message is to be displayed, the message data is output from microprocessor 56 on line 70 to a conventional video display generator 66 provided in the converter. A crystal 68 provides a stable clock signal for the video display generator. Video display generator 66 outputs a video signal containing an alphanumeric and/or graphic image as specified by the message data. The image is coupled to one input of switch 50 and also to a conventional adder 48 which can comprise, for example, an operational amplifier for adding two input signals together. The other input to adder 48 is the video signal processed by the first path 41 of the converter. The output of adder 48 is coupled to a second input of switch 50. A third input of switch 50 receives the video signal directly from first path 41.

Switch 50, which can comprise a conventional solid-state switch, is actuated by microprocessor 56 via line 72 to output either the received video signal from first path 41, the received video signal combined with the message signal output from adder 48, or the message signal output from video display generator 66 by itself. The signal output from switch 50 is modulated by modulator 52 for display on a subscriber's television.

The selection of a signal to be output from switch 50 can be based on various criteria. If no video signal is present in the first path 41 when there is a message to be displayed (e.g., in the case of an emergency message or if a subscriber's service has been suspended), the message image alone will be chosen so that it can be viewed without interference from first path 41. If there is no video signal present on the first path, sync detector 64 will fail to lock on the horizontal or vertical sync signal normally associated with a video signal, and output a signal to microprocessor 56 indicative of this fact. In response, microprocessor 56 will output a switch control signal on line 72 to couple modulator 52 solely to the output of video display generator 66.

In another scenario, an emergency message signal from the headend may have a control code in its tag data that directly instructs microprocessor 56 to output a control signal on line 72 for actuating switch 50 to output only the message. Where a nonemergency message is involved, and a video signal is being viewed by a subscriber, switch 50 will be actuated to output the combined signal from adder 48. In this manner, the message will be overlaid on the video program being viewed.

In the overlay mode, video display generator 66 will be synchronized with the video signal in the first path of the converter by using the detected sync signal from detector 64. If the microprocessor determines that no video signal is present, it commands the video display generator to generate its own sync signal. In an alternate embodiment, a determination by microprocessor 56 that there is no video signal in first path 41 can be interpreted as an indication that the subscriber's television is not currently in use. In this instance, messages will be stored in RAM 60 for later retrieval and display by the subscriber, and microprocessor 56 will provide a message waiting indicia to the subscriber, such as by lighting lamp 19 on the converter, providing a unique symbol on the converter channel number display, or generating a message waiting screen for display on the subscriber's television when powered on. Upon retrieval from RAM 60, the subscriber would ordinarily be permitted to delete the message from the converter, e.g., by entering a delete command via the converter remote control unit.

Figure 3:
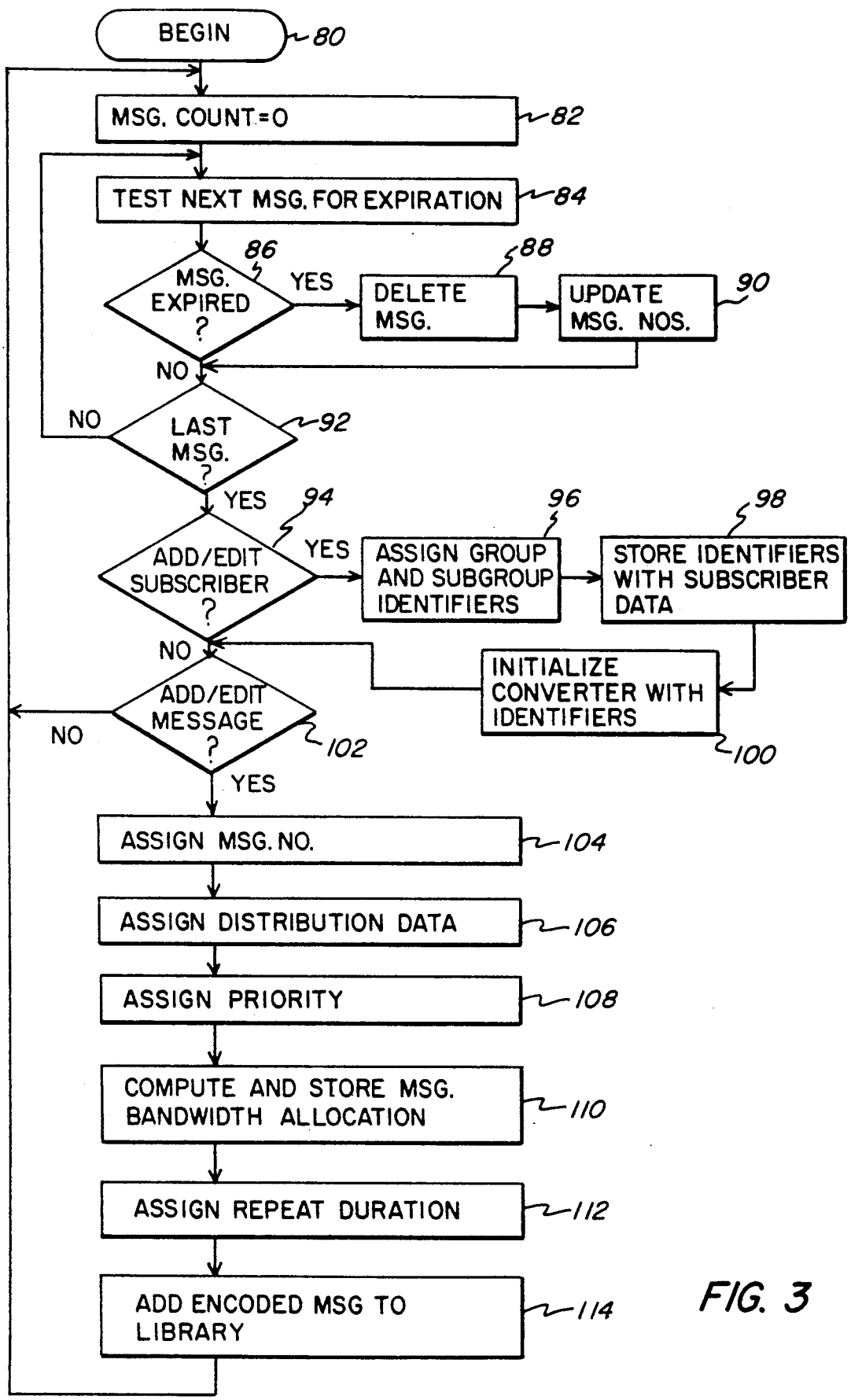
FIG. 3 is a flowchart illustrating a headend addressable controller routine in accordance with the present invention.

FIG. 3 illustrates an example of a software routine that can be executed by addressable controller 24 in accordance with the present invention. The routine first cycles through a library of messages to delete any that have expired. Then, the subscriber database is updated by enabling a system operator to add new subscribers or edit data for existing subscribers. The system operator can then add new messages to the message library or edit existing messages. Those skilled in the art will appreciate that the three major functions of the routine illustrated can be alternately implemented in a multitasking operating system, so that the functions can be provided independently instead of consecutively.

The illustrated routine begins at box 80, and at box 82 a message count is set to zero. Each message in a library of messages currently being transmitted by the headend has a message number associated with it, and the numbers are maintained in a consecutive order. As new messages are added, the message count is incremented and as messages are deleted, the message count is decremented.

At box 84, the next message is tested for expiration. Typically, each message will only be transmitted for a limited time period. The time period is referred to as the "repeat duration" for each message. The messages are periodically retransmitted during their repeat duration, so that if a subscriber terminal does not capture the message the first time it is transmitted, it will have additional opportunities to do so. If the repeat duration of a message has passed, the message will be considered to have expired and this fact is detected at box 86. Control is then passed to box 88, where the message is deleted from the library. At box 90, the numbers of the remaining messages in the library are updated. In certain cases, a system operator may desire to preclude message expiration by assigning an unlimited repeat duration. For example, if a message is transmitted to an individual subscriber demanding payment of an overdue bill, the operator may want the message to remain until payment is received. Such a message would not expire, and would have to be manually cancelled by the system operator. The subscriber would not be permitted to delete the message.

At box 92, a determination is made as to whether the last message in the library has been tested. If not, the process continues until all messages have been tested, and the library has been cleansed of any expired messages.

After the library has been updated, control passes to box 94 where the system operator is provided with an opportunity to add an additional subscriber or to edit the data for a current subscriber. If a subscriber record is to be added or edited, control passes to box 96 and the system operator is prompted to assign group and subgroup identifiers for the subscriber. As noted above, a group identifier may be the hub that serves the subscriber. A subgroup identifier may relate to a specific interest of the subscriber or socioeconomic criteria, etc. At box 98, the group and subgroup identifiers are stored in the addressable controller memory with the remaining subscriber data such as the subscriber's name, address, and network services subscribed to. Those skilled in the art will appreciate that although the flowchart of FIG. 3 only illustrates the specific steps required to implement the present invention, additional information relating to the subscriber (e.g., name and address) must also be input by the system operator in a conventional manner.

After the group and subgroup identifiers have been stored, addressable controller 24 proceeds to initialize the subscriber's converter with the applicable identifiers as indicated at box 100. This is done via the addressable data path in the same manner that a converter is initialized with service authorization data.

After subscriber data has been added or edited, the system operator is given an opportunity to add or edit a message in the message library. If the operator selects this option at box 102, control is passed to box 104 where the addressable controller assigns a new message number. At box 106, distribution data is assigned to the message in response to information input by the system operator. The distribution data defines which groups and/or subgroups the message is to be disseminated to. The distribution data will also include any control codes specified by the system operator. At box 108, the system operator is prompted to assign a priority to the message. An emergency message (e.g., instructing volunteer firemen to respond to a call) will be assigned the highest priority, while other messages will be assigned lower priorities on a scale provided by the system. High priority messages will need to be transmitted more often than lower priority messages. For this reason, at box 110 the addressable controller computes and stores message bandwidth allocations for all of the messages currently in the library. The messages are transmitted cyclically together with subscriber terminal authorization data and other housekeeping/control data necessary for operation of the system. Since the data channel only has a fixed bandwidth, it is necessary to allocate the bandwidth among the various data signals. Typically, authorization data will account for 80 percent of the bandwidth, housekeeping/control data will account for ten percent of the bandwidth, and ten percent of the data channel bandwidth will be reserved for messages. Thus, for every ten packets of data transmitted, eight will contain authorization data, one will contain housekeeping/control data, and one will contain message data. Although there may be numerous messages in the library at any given time, a single high priority message may be allocated most of the message data bandwidth. This will ensure that the emergency messages get to their destinations without delay.

At box 112, the system operator is prompted to assign a repeat duration for the message being added or edited. A particular message might be repeated for several minutes, several hours, or several days depending on the circumstances, to increase the probability that it will be received by all members of the group or subgroup(s) to which it is directed. After all the parameters for a message have been defined, the message text and/or graphics is entered, and the message together with the pertinent tag data is added to the message library for transmission over the communication network. The routine then returns to box 82 and the process continues.

It should now be appreciated that the present invention provides a selective message distribution scheme for communication networks such as cable television systems. Although the invention has been described in connection with a preferred embodiment thereof, those skilled in the art will recognize that numerous adaptations and modifications may be made thereto without departing from the spirit and scope of the invention, as set forth in the following claims.

What is claimed is:

1. A converter for processing signals received from a communications network, comprising:
a first path for processing a received video signal;

a second path for processing a received message signal, including means for retrieving tag data appended to said message signal;

means responsive to said tag data for generating a control signal; and switch means responsive to said control signal for selectively outputting to a display a processed video signal from said first path, a processed message signal from said second path, or a combined output comprising both said processed video and processed message signals.

2. A converter in accordance with claim 1 further comprising:

means for determining if a video signal is present in said first path; and means responsive to said determining means for actuating said switch means to output only said processed message signal when there is no video signal present in the first path.

3. A converter in accordance with claim 2 wherein said determining means comprises a video sync detector.

4. A converter in accordance with claim 1 further comprising:

means responsive to said tag data for energizing said converter to output an emergency message if the converter is de-energized at the time the emergency message is received.

5. A converter in accordance with claim 1 further comprising:

video display generator means in said second path for converting data contained in said received message signal to a video message signal for input to said switch means.

6. A converter in accordance with claim 5 further comprising:

means for detecting a video sync signal in said first path; and means for inputting said video sync signal to said video display generator for use in synchronizing the video message signal to said processed video signal.

7. A converter in accordance with claim 6 further comprising:

means for determining if a video signal is present in said first path;

means responsive to said determining means for actuating said switch means to output only said processed message signal when there is no video signal present in the first path; and means responsive to said determining means for generating a sync signal for said video display generator when there is no video signal present in said first path.

8. A converter for processing signals received from a communications network, comprising:

a first path for processing a received video signal;

a second path for processing a received message signal;

memory means coupled to said second path for storing message data obtained from said message signal;

means coupled to said second path for retrieving tag data appended to said message signal; and means responsive to said retrieved tag data for outputting said message data combined with a processed video signal from said first path, outputting said message data alone, or storing said message data in said memory means.

9. A converter in accordance with claim 8 further comprising:

means for generating a message waiting indicia when said message data is stored in said memory means.

10. A converter in accordance with claim 9 further comprising:

means for retrieving at least a portion of the message data from said memory means; and means for outputting the retrieved message data.

11. A converter in accordance with claim 8 further comprising:

means responsive to retrieved tag data for energizing said converter to output an emergency message if the converter is de-energized at the time the message is received.

12. Apparatus for selectively distributing messages over a communications network comprising:

an addressable controller for communicating with a plurality of subscriber terminals served by a communications network;

means operatively associated with said addressable controller for assigning each of said subscriber terminals to a primary message group;

means operatively associated with said addressable controller for assigning selected ones of said subscriber terminals to one or more message subgroups;

means for inputting text messages to said addressable controller for subsequent transmission to a subscriber terminal for display;

means operatively associated with said addressable controller for tagging said messages with distribution data defining at least one primary message group or message subgroup to receive the message; and means for transmitting the tagged text messages over the network together with signals from network service providers.

13. Apparatus in accordance with claim 12 further comprising:

means operatively associated with said addressable controller for generating a wild card tag for a message, thereby allowing said message to be received by an expanded set of subscriber terminals that is not limited to a specific primary message group and message subgroup combination.

14. Apparatus in accordance with claim 12 wherein said messages are transmitted together with control data in an addressable data stream carried on said network.

15. Apparatus in accordance with claim 14 further comprising:

bandwidth allocation means operatively associated with said addressable controller for allocating bandwidth within said data stream among said messages.

16. Apparatus in accordance with claim 15 wherein said bandwidth allocation means allocates more bandwidth to messages having a high priority than to messages having a lower priority.

17. Apparatus in accordance with claim 12 further comprising:

means operatively associated with said addressable controller for periodically repeating the transmission of at least one of said tagged text messages over the network for a predetermined time period.

18. A subscriber terminal for receiving messages from the apparatus of claim 12 comprising:
- a first path for processing a service signal received from the network;
- a second path for processing a message signal received from the network;
- means for retrieving said distribution data from a received one of said tagged text messages;
- means responsive to the retrieved distribution data for determining if the received message is targeted to the subscriber terminal; and
- means responsive to said determining means for processing the receive message for display if it is targeted to the terminal.

19. A terminal in accordance with claim 18 further comprising:
- means for selectively displaying said received message alone or in combination with a processed service signal from said first path.

20. A subscriber terminal for processing signals received from a communications network, comprising:
- means for processing a received video service signal to provide a video program to a display; and
- means for processing a received message signal to selectively provide a message for output to said display, including:
  - means for retrieving multilevel distribution data including a primary message group identifier and a message subgroup identifier associated with said received message signal;
  - means responsive to the primary message group and message subgroup identifiers in the retrieved distribution data for determining if the received message signal is targeted to the subscriber terminal; and
  - means responsive to said determining means for converting the received message signal to said message for output to said display if the received message signal is targeted to the terminal.

21. A converter for processing signals received from a communications network, comprising:
- a first path for processing a received video signal;
- a second path for processing a received message signal;
- switch means responsive to a control signal for selectively outputting to a display a processed video signal from said first path, a processed message signal from said second path, or a combined output comprising both said processed video and processed message signals;
- means for determining if a video signal is present in said first path; and
- means responsive to said determining means for actuating said switch to output only said processed message signal when there is no video signal present in the first path.

* * * * *